July 20, 1954     L. STEENHUIS     2,683,932
APPARATUS FOR SUPPLYING PREDETERMINED QUANTITIES
OF FLUID OR PLASTIC SUBSTANCES
Filed Aug. 27, 1951     2 Sheets-Sheet 1
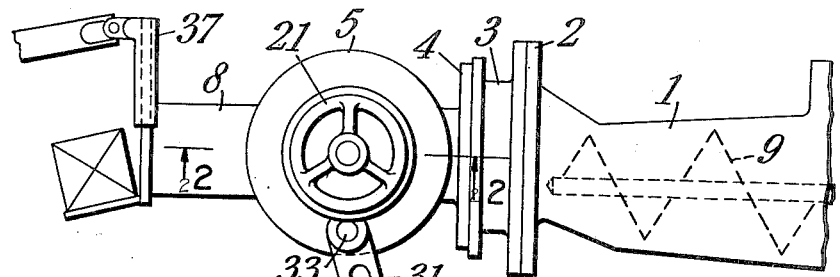
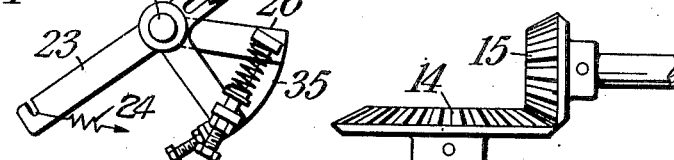
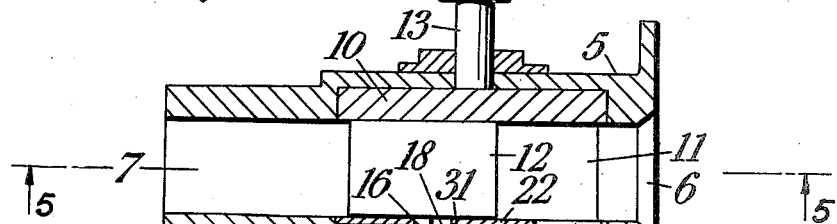
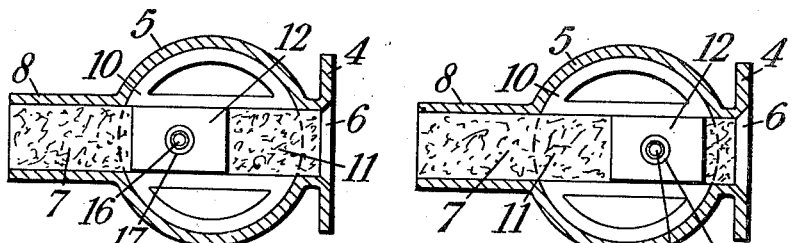
INVENTOR:—
Ludwig Steenhuis
by Campbell, Brumbaugh, Free & Graves,
Attorneys.

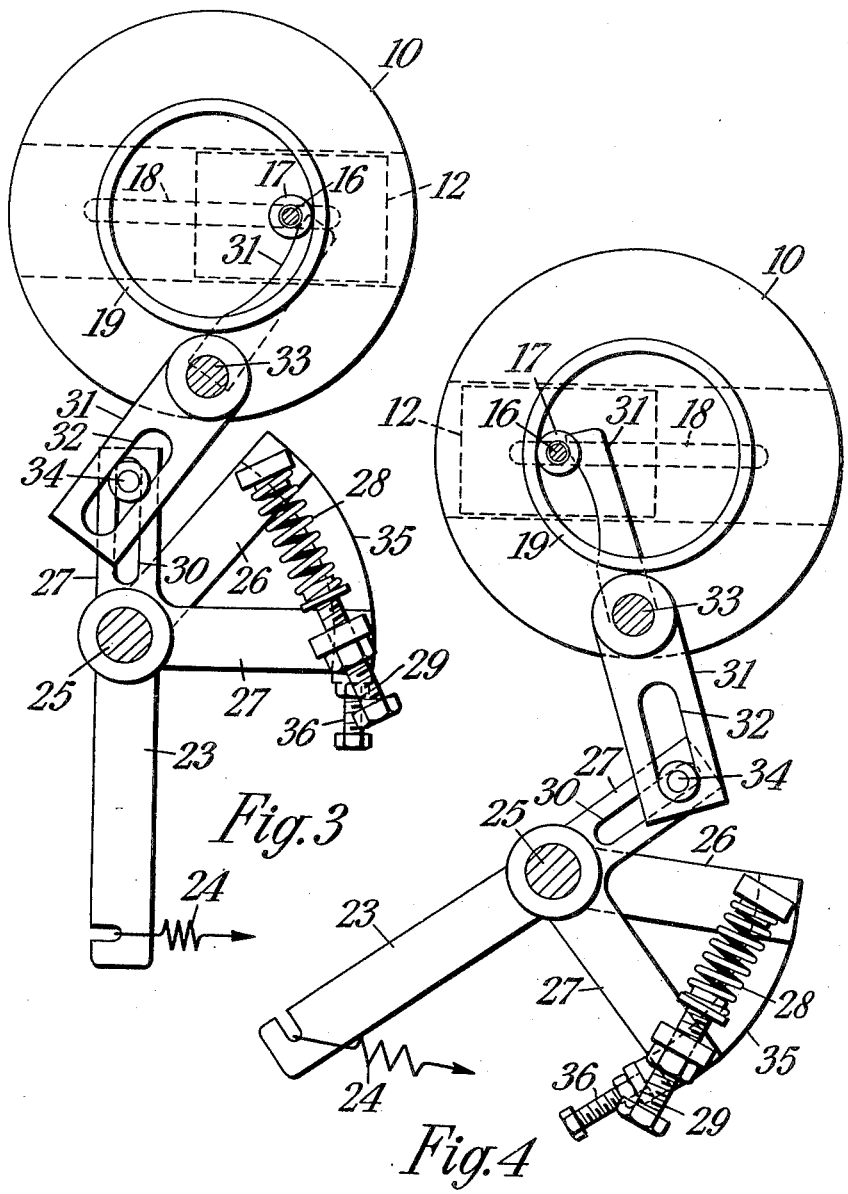

Patented July 20, 1954

2,683,932

UNITED STATES PATENT OFFICE 2,683,932

APPARATUS FOR SUPPLYING PREDETERMINED QUANTITIES OF FLUID OR PLASTIC SUBSTANCES

Ludwig Steenhuis, Donsbruggen uber Kleve, Germany, assignor to Lever Brothers Company, New York, N. Y., a corporation of Maine Application August 27, 1951, Serial No. 243,874

Claims priority, application Netherlands September 1, 1950

6 Claims. (Cl. 31—14)

This invention relates to an apparatus for supplying predetermined quantities of liquid or plastic substances and to the shaping of plastic substances. This invention is particularly applicable in the field of margarine and similar substances.

It is an object of the present invention to provide an improved method of supplying predetermined quantities of fluid or plastic substances.

It is a further object of the present invention to provide an improved apparatus for supplying predetermined quantities of fluid or plastic substances.

Another object of the present invention is to provide an apparatus for supplying predetermined quantities of fluid or plastic substances in which the quantity is readily adjustable.

A further object of the present invention is to provide an apparatus for supplying predetermined quantities of plastic substances in the form of prints said prints having plain end-faces.

According to the present invention there is provided a method of supplying predetermined quantities of fluid or plastic substances comprising rotating a die, having a plunger track and a plunger, to bring one end of the plunger track into line with a source of said substance, moving the plunger in said plunger track through a predetermined stroke to permit a predetermined volume of the substance from said source to enter said track, rotating said die so that said end of the track is out of line with said source, and moving the plunger through the same stroke length to eject the substance from the track.

The die may be enclosed in a casing provided with an inlet and an outlet having a common axis perpendicular to the axis of rotation of the die. This common axis will hereinafter be referred to as the casing axis. The plunger track may extend throughout the entire length of said die perpendicular to the axis of rotation of the die and the plunger track is said to be in its normal position when it is in line with the inlet and outlet. When the plunger track extends throughout the entire length of the die, the plunger can be made double acting. In this case, the die is rotated to bring the plunger track to its normal position with the plunger in its extreme position near the inlet, the plunger is then moved from its extreme position near the inlet to its other extreme position near the outlet so as to permit the entry of a predetermined volume of the substance into the plunger track behind the plunger whilst simultaneously ejecting an equal volume of the substance in front of the plunger, the die is then rotated through 180°, and the movement of the plunger is repeated so that during every cycle a predetermined volume of the substance enters the plunger track whilst simultaneously an equal volume of the substance which had entered the plunger track during the previous cycle is ejected from the other end.

If it is desired to obtain a print of plastic substance having flat end-faces, the plastic substance emerging from the outlet may be cut once after every ejection stroke of the plunger. In this case, the quantity of the plastic substance cut-off equals the quantity ejected by the plunger and is independent of such factors as the speed and interval of cutting of the substance.

It may be preferable in some cases to utilise the pressure of the substance for filling the plunger track. In this case, should the plunger be double acting, the pressure of the substance also causes the plunger to eject the substance which has entered the plunger track during the previous cycle.

According to the present invention there is also provided an apparatus for supplying predetermined quantities of fluid or plastic substances comprising a casing with an inlet and an outlet, a die intermittently rotatable in said casing, a plunger track in said die perpendicular to the axis of rotation, a plunger slideable in said plunger track, means for limiting the stroke of the plunger, and means for intermittently rotating or oscillating the die to align the open end of the track alternately with the inlet and outlet.

The plunger track may extend throughout the entire length of the die in which case the inlet and outlet of the casing are arranged to be coaxial and to be in line with the plunger track when the plunger track is in its normal position.

The means for limiting the stroke of the plunger may be adjustable.

A cutting device may be provided at the end of the outlet, said cutting device being arranged to be operated once after every ejection stroke of the plunger. The casing may be extended at the outlet by means of an outlet pipe, in which case the cutting device is situated at the end of the outlet pipe.

The inlet, plunger track, and outlet may have the same cross-section. However, should a print of a plastic substance of special cross-section be required, the cross section of the outlet may be different from that of the plunger track. It may also be desirable for some purposes to make the cross-section of the plunger track circular, and that of the outlet rectangular.

A preferred form of the invention for supplying prints of margarine having a predetermined volume will now be described with reference to the accompanying drawings in which:

Fig. 1 is a side elevation of the apparatus;

Fig. 2 is a horizontal cross section of part of the apparatus taken on the line 2—2 of Fig. 1 and shown in enlarged scale;

Figs. 3 and 4 are side elevations in enlarged scale, partly in cross section taken on the line 3—3 of Fig. 2, showing the means for actuating the plunger;

Figs. 5 and 6 are cross sectional elevations taken on the line 5—5 of Fig. 2 showing the plunger at its two extreme positions and shown in regular scale.

The substance is fed to the apparatus through a pipe 1 which terminates in a flange 2. A connecting piece 3 connects the pipe flange 2 with a flange 4 of the casing 5 which is provided with an inlet opening 6. The casing 5 is also provided with an outlet opening 7 co-axial with and opposite to the inlet opening 6. An outlet pipe 8, the purpose of which will be explained below, is provided integral with the casing 5. The axis connecting the inlet and outlet openings will be referred to as the casing axis. The substance is forced through the bore of the connecting piece 3 by means of a screw 9 in the pipe 1, or in some other manner.

The casing 5 contains a cylindrical die 10 which rotates intermittently about an axis, hereinafter referred to as the die rotating axis, at right angles to the casing axis. The die 10 is provided with a plunger track 11, which extends throughout the die and is at right angles to the die rotation axis, so that, in the normal position it is co-axial with the casing axis. The plunger track 11 contains a movable plunger 12 which is a sliding fit in the track. The plunger track 11, the inlet 6, the outlet 7, and the outlet pipe 8, are of identical cross section, namely that of the required "print." The die 10 is rotated by means of a shaft 13 which is driven through bevel gears 14, 15. The rotation of the screw 9 may be synchronised with the rotation of the die.

The plunger 12 is provided with a peg 16 which terminates in a conical roller 17. The peg 16 protrudes through a slot 18 in the die 10. A drum 19, the internal surface 19a of which has the same taper as the conical roller, is mounted in the casing 5 in such a manner that it can slide along the die rotation axis. The position of the drum is controlled by means of an adjusting screw 20, one end of which is rotatably fixed to the drum 19, the other end being fixed to a hand wheel 21. The part of the casing through which the screw 20 passes is screw threaded so that, by turning the hand wheel 21, the drum 19 can be slid along the die rotation axis towards and away from the casing axis. The plunger stroke is the diameter of the drum at that portion of its internal circumference which comes into contact with the roller. This diameter is adjustable by sliding the drum along the die rotation axis.

The part of the slot 18 not occupied by the peg 16 is covered by a plate 22 carried by the peg in order to prevent part of the margarine escaping through the slot 18.

The means for actuating the plunger comprise a cam follower 23 which is kept in contact with a cam (not shown) by means of a spring 24 (shown diagrammatically). The cam follower is fixed to a spindle 25. The spindle 25 has also fixed to it an arm 26 so that the cam follower 23 and arm 26 are rigidly connected by the spindle 25. An L shaped lever 27 is journalled on the spindle 25. One end of the lever 27 is connected to the arm 26 by means of a compressional spring 28 which is adjustable by means of a bolt 29. The other end of the lever 27 is provided with a slot 30. A lever 31, provided with a slot 32 at one end, is journalled to the casing 10 at 33 and is connected to lever 27 by a peg 34 which works in slots 30 and 32. The other end of the lever 31 is in contact with the peg 16 of the plunger 12. This mechanism is the plunger moving means.

The operation of the plunger is as follows. Assuming the plunger is in the position shown in Figures 3 and 5, the cam will cause the cam follower 23 to turn clockwise. This causes a corresponding movement of the spindle 25 and arm 26. The movement is transferred to the L shaped lever 27 by the spring 28 thereby causing the lever 31 to turn anti-clockwise. The lever 31 pushes the peg 16 until its roller 17 comes into contact with the drum 19. Any further movement of the cam follower is taken up as lost motion by the spring 28, which also ensures that the lever 31 is at all times sprung against the peg 16. To return the lever 31, the cam follower 23 turns anti-clockwise. This turning action is brought about by the spring 24 and also causes the shaft 25 as well as the arm 26 to turn anti-clockwise. A segment 35 attached to the arm 26 engages the lever 27 near its free end and causes a corresponding movement thereof. This causes the lever 31 to move in a clockwise direction. The segment 35 is adjustable by means of a bolt 36.

A cutting device 37, shown diagrammatically in Figure 1, is situated at the open end of the outlet pipe 8. For substances such as margarine a cutting device in the form of a wire is preferred. The length of the outlet pipe 8 is just shorter than twice the plunger stroke.

The operation of the machine is as follows. Margarine is forced from the continuously operated margarine producing machine through the pipe 1 by means of a screw 9. Assuming that the plunger 12 is in the position shown in Figures 3 and 5, the plunger then starts to move to the left forcing the margarine in front of the plunger into the outlet pipe 8 whilst, simultaneously, the space in the plunger track behind the plunger is filled with margarine partly by suction from the plunger and partly by the pressure of the margarine. When the plunger has moved to the position shown in Figures 4 and 6, it has sucked into the plunger track 11 a volume of margarine equal to the volume ejected. The die 10 then rotates through 180° so that the plunger is again in the position shown in Figures 3 and 5 without a sliding motion having been imparted to it. The margarine in the plunger track 11 which was to the right of the plunger is now to the left of the plunger. The plunger then moves again to the left, ejecting the previously sucked in margarine and simultaneously sucking in an equal volume of margarine. Thus every time the die is rotated through 180°, a block of margarine is ejected by the plunger. The plunger is, consequently, double acting. Due to the fact that the end faces of the block are shaped by the rotation of the die, they are not flat but have the same curvature as the die. It is however often desirable to form a print having flat end faces. As has been stated above, the outlet pipe 8 has a length of just under double the plunger stroke, so that when a block is pushed into the outlet pipe it is rammed into the previously ejected block which is still in the pipe. As the end forces of the blocks have the same curvature, the blocks fit together to form a continuous bar of margarine, the seam between blocks not being noticeable. Thus, every time the plunger moves to the left a volume of margarine is pushed out of the outlet pipe 8, this volume being identical to that of the block ejected by the plunger. The cutting device 37 operates during the rotation of the die 10 when the plunger is not moving in the plunger track. Thus the cutting device cuts off a print having flat end faces and having a volume identical to the block of margarine ejected by the piston every time the die rotates through 180°, that is once every cycle.

It will be noted that, provided the cutting device operates between the strokes of the plunger, the volume of the print is identical with the volume of the block ejected by the plunger and is independent of such factors as the speed of operation of the machine.

It will be evident that, if it is not necessary to form a print having flat end faces, for example when the apparatus is used to fill containers, a short outlet pipe may be used in which case the cutting device 37 can be dispensed with.

It will also be noted that the means for moving the plunger do not pass through the substance, thereby avoiding "working" the substance.

As many plastic substances can not readily be removed from a metallic surface, it has been preferred to arrange the apparatus so that, even when the plunger stroke is at its maximum, the end face of the plunger does not reach the die surface. Thus there is always a certain amount of margarine left in the plunger track, and inaccuracies due to the formation of flakes of margarine which adhere to the end face of the plunger do not occur. This arrangement has the additional advantage that the end face of the plunger need not have the same curvature as the die, but may be flat.

I claim:

1. Apparatus for supplying predetermined quantities of fluid or plastic substances comprising a casing having inlet and outlet means, a die mounted in the casing and rotatable about an axis therein, a plunger track in the die perpendicular to the axis of rotation and having at least one open end adapted to be placed in communication successively with said outlet and inlet means and to receive and discharge the substance, a plunger movable in the plunger track to facilitate the receipt and discharge of the substance, driving means operatively connected to the die for intermittently turning the die about the axis to align the said end of the track alternately with the inlet and outlet means to respectively receive and discharge the substance, and means for reacting against the plunger for limiting the length of the stroke of the plunger to a distance less than the length of the plunger track and for stopping the plunger at a point spaced from the said open end of the track, whereby some of each volume of the substance being discharged from the die will remain in the die, thereby to obviate inaccuracies due to the adherence of matter to the plunger.

2. Apparatus as set forth in claim 1 including a cutting device mounted at said outlet and operable to cut the substance therein once after every stroke of the plunger.

3. Apparatus for supplying predetermined quantities of fluid or plastic substances comprising a casing having inlet and outlet means, a die mounted in the casing and rotatable about an axis therein, a plunger track in the die having at least one open end adapted to be placed in communication successively with said outlet and inlet means and to receive and discharge the substance, a plunger mounted in the plunger track and movable therein to facilitate receipt and discharge of the substance, driving means operatively connected to the die for intermittently turning the die about the axis to align the said end of the track alternately with the inlet and outlet means to respectively receive and discharge the substance, stop means movable with the plunger, cooperative stop means carried by the casing to engage the stop means of the plunger to limit the stroke thereof, and operative driving means engaging the plunger to move it back and forth between the limits defined by the stop means.

4. Apparatus as set forth in claim 3, including adjusting means connected to the stop means carried by the casing for varying the spacing of the latter stop means relative to the stop means of the plunger, thereby to control the stroke of the plunger without varying the length of the plunger and to limit the stroke of the plunger so that the plunger never reaches the die surface.

5. Apparatus as set forth in claim 4, said stop means of the plunger comprising a peg fixed to the plunger and said cooperative stop means of the casing including a drum having a conical inner surface to be engaged by the peg, whereby movement of the drum toward and away from the plunger respectively decreases and increases the travel of the plunger in the die.

6. Apparatus for supplying predetermined quantities of fluid or plastic substances comprising a casing with an inlet and an outlet, a die mounted on the casing and rotatable about an axis therein, a plunger track in said die perpendicular to the axis of rotation and adapted to be placed in communication with said inlet and outlet to receive and discharge the substance, a plunger slidable in said plunger track, means for intermittently turning the die about the axis to align one end of the track alternately with the inlet and outlet whereby the substance may be received in and discharged from the track, and adjustable means for varying the limits between which the plunger may move in the track comprising a peg fixed to the plunger at right angles to the plunger track, said die having a slot formed therein, said peg protruding through the slot in the die, a conical roller carried by the peg, a drum having an internal surface which has the same taper as the roller, said drum being mounted to receive the roller, and means for adjusting the distance of the drum from the casing axis so as to vary the stroke of the plunger, which is the diameter of the drum at that portion of its internal circumference which comes into contact with the roller.

References Cited in the file of this patent

UNITED STATES PATENTS

| Number | Name | Date |
|---|---|---|
| 192,128 | Perry | June 19, 1877 |
| 615,421 | Beyer et al. | Dec. 6, 1898 |
| 1,171,330 | Embrey | Feb. 8, 1916 |
| 1,699,818 | Strickland | Jan. 22, 1929 |
| 1,872,103 | Bergmann | Aug. 16, 1932 |
| 2,528,234 | Lilien | Oct. 31, 1950 |
| 2,539,232 | Dempster | Jan. 23, 1951 |